(12) United States Patent
Tompkins

(10) Patent No.: US 11,890,901 B2
(45) Date of Patent: Feb. 6, 2024

(54) SYSTEMS AND METHODS FOR PROVIDING TIRE CHANGE INFORMATION

(71) Applicant: Toyota Motor North America, Inc., Plano, TX (US)

(72) Inventor: Equan Tompkins, Aubrey, TX (US)

(73) Assignee: Toyota Motor North America, Inc., Plano, TX (US)

( * ) Notice: Subject to any disclaimer, the term of this patent is extended or adjusted under 35 U.S.C. 154(b) by 631 days.

(21) Appl. No.: 16/681,256

(22) Filed: Nov. 12, 2019

(65) Prior Publication Data

US 2021/0138851 A1    May 13, 2021

(51) Int. Cl.
| | |
|---|---|
| *B60C 23/04* | (2006.01) |
| *G08G 1/017* | (2006.01) |
| *H04W 4/02* | (2018.01) |
| *G07C 5/00* | (2006.01) |
| *B60C 11/24* | (2006.01) |
| *G06Q 30/02* | (2023.01) |
| *G08G 1/01* | (2006.01) |
| *G06Q 30/0207* | (2023.01) |

(52) U.S. Cl.
CPC ........ *B60C 23/0479* (2013.01); *B60C 11/243* (2013.01); *B60C 11/246* (2013.01); *G06Q 30/0207* (2013.01); *G07C 5/006* (2013.01); *G07C 5/008* (2013.01); *G08G 1/017* (2013.01); *G08G 1/0112* (2013.01); *H04W 4/023* (2013.01)

(58) Field of Classification Search
CPC . B60C 23/0479; B60C 11/243; B60C 11/246; G06Q 30/0207; G06Q 10/04; G06Q 10/20; G07C 5/006; G07C 5/008; G08G 1/0112; G08G 1/017; H04W 4/023; H04W 4/08; H04W 4/021; H04W 4/029
See application file for complete search history.

(56) References Cited

U.S. PATENT DOCUMENTS

| | | | |
|---|---|---|---|
| 6,278,361 B1 | 8/2001 | Magiawala et al. | |
| 7,129,825 B2 | 10/2006 | Weber | |
| 9,053,588 B1 * | 6/2015 | Briggs | G07C 5/006 |
| 9,530,121 B2 | 12/2016 | Brauer et al. | |
| 9,552,680 B2 | 1/2017 | Lavoie | |
| 9,831,922 B1 | 11/2017 | Robinson | |
| 2013/0166360 A1 * | 6/2013 | Kshetramade | G06Q 30/02 705/14.1 |
| 2016/0075189 A1 | 3/2016 | Engel et al. | |
| 2017/0010185 A1 | 1/2017 | Shaffer | |
| 2018/0096542 A1 | 4/2018 | Daley et al. | |

FOREIGN PATENT DOCUMENTS

| | | | | |
|---|---|---|---|---|
| KR | 101410545 B1 * | 7/2014 | | G06Q 50/30 |
| WO | 201949807 A1 | 3/2019 | | |

* cited by examiner

*Primary Examiner* — Russell Frejd
*Assistant Examiner* — Ana D Thomas
(74) *Attorney, Agent, or Firm* — Dinsmore & Shohl LLP

(57) ABSTRACT

A system for providing tire change information is provided. The system includes a processor, and a memory module storing one or more processor-readable instructions that when executed by the processor cause the processor to: determine a number of vehicles within a first region that requested a tire change, determine whether the number of vehicles is greater than a first threshold number, and provide information about a first tire change group discount to the vehicles that requested the tire change in response to determining that the number of vehicles is greater than the first threshold number.

10 Claims, 4 Drawing Sheets

SYSTEMS AND METHODS FOR PROVIDING TIRE CHANGE INFORMATION

TECHNICAL FIELD

The present specification generally relates to systems and methods for providing tire change information and, more specifically, to systems and methods for providing tire change information by monitoring the number of vehicles that requested tire changes in a region.

BACKGROUND

Tires generally have a tread including a plurality of grooves and are made from a relatively soft, durable material. Over the life of the tire, the tread may degrade, negatively impacting the traction of the tire and requiring tire maintenance or replacement. Tires may wear more rapidly on some vehicles than others due to multiple factors, such as tire make and model, driving style, weather conditions, road grade, and other factors. Recommendations for changing tires may be based on regular intervals (e.g., a time or distance the tires have been in use) that are calculated across an entire make and/or model of tires without accounting for differences in these factors. Accordingly, systems and methods for monitoring tire wear conditions and providing tire change information are needed.

SUMMARY

In one embodiment, a system for providing tire change information is provided. The system includes a processor, and a memory module storing one or more processor-readable instructions that when executed by the processor cause the processor to: determine a number of vehicles within a first region that requested a tire change, determine whether the number of vehicles is greater than a first threshold number, and provide information about a first tire change group discount to the vehicles that requested the tire change in response to determining that the number of vehicles is greater than the first threshold number In another embodiment, a method for providing tire change information is provided. The method includes determining a number of vehicles that requested a tire change, determining whether the number of vehicles is greater than a first threshold number, and providing information about a first tire change group discount to the vehicles that requested the tire change in response to determining that the number of vehicles is greater than the first threshold number.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Tires may be made from a relatively soft, durable material (e.g., rubber) that wears away as the tire is used. As tires wear, traction with a road may decrease. In order to maintain proper traction with a surface of a road, the tire may require replacement. However, it can be difficult to determine when a tire needs to be replaced.

Figure 1:
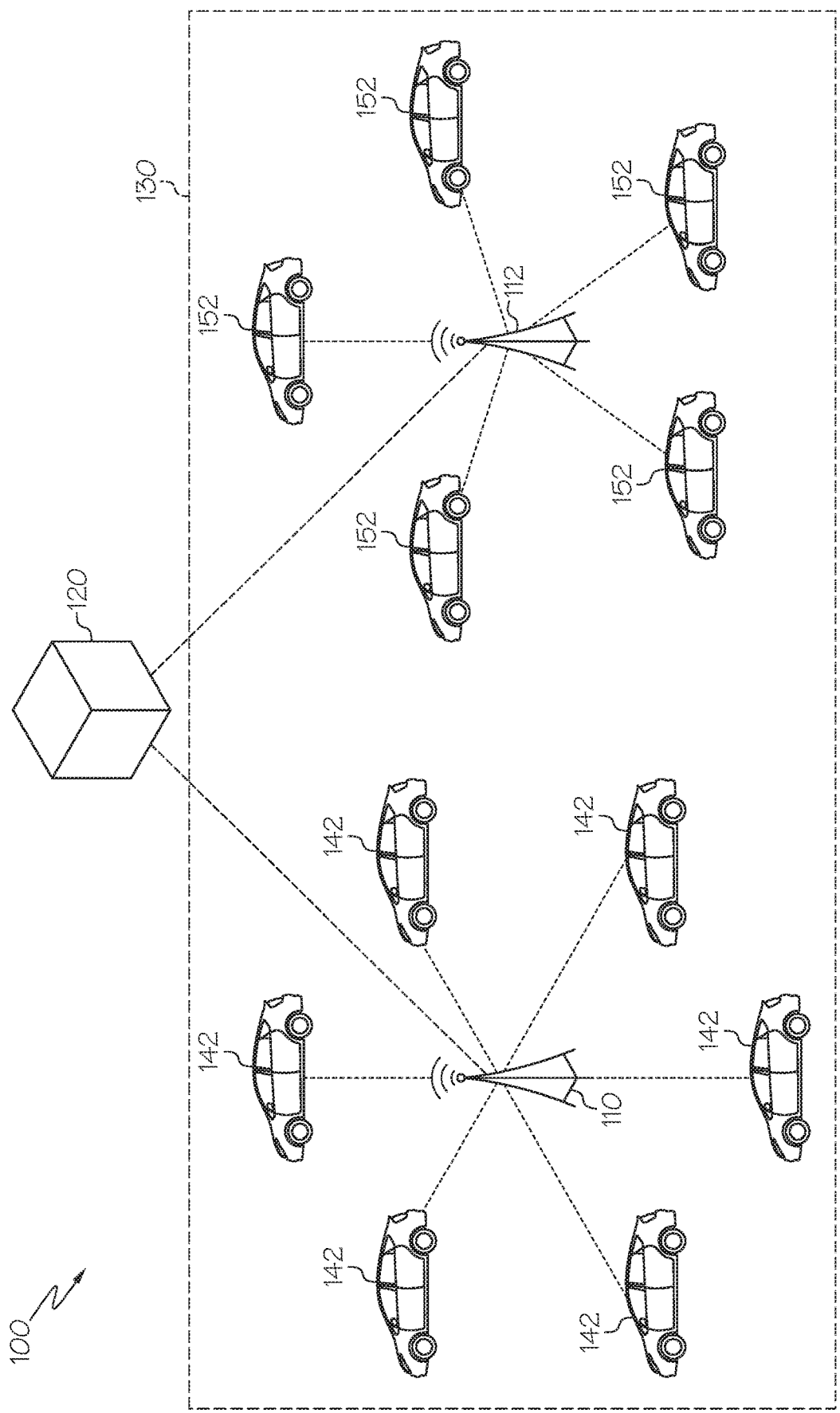
FIG. 1 schematically depicts a system for collecting tire wear information from a plurality of vehicles in an area, according to one or more embodiments shown and described herein.
Figure 4:
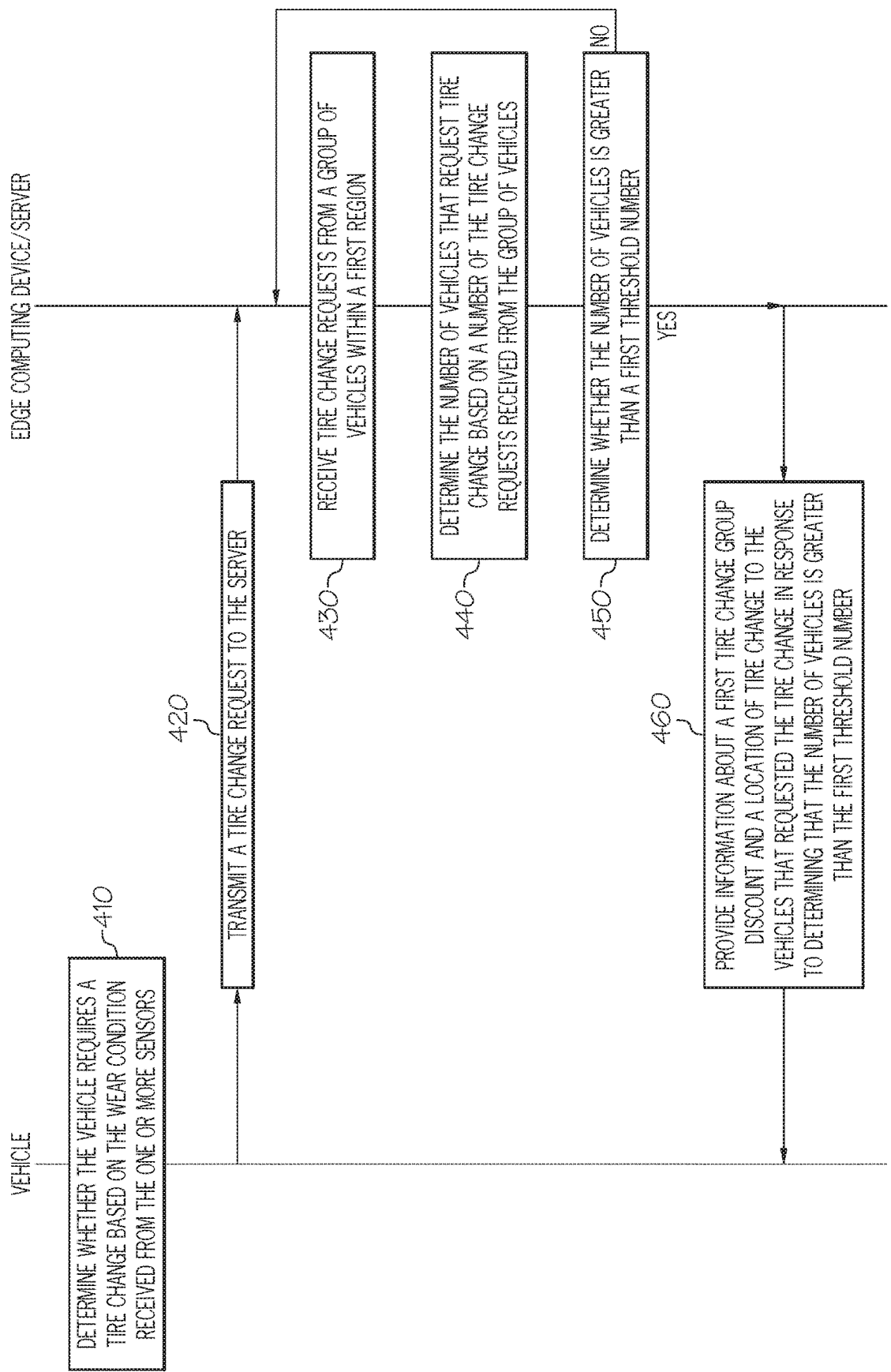
FIG. 4 depicts a flowchart for providing tire change information to a group of vehicles, according to one or more embodiments shown and described herein.

Referring generally to FIGS. 1 and 4, embodiments of the present disclosure are directed to a system for providing tire change information. The system 100 includes a server 120 and a plurality of vehicles 142 and 152. Each of the vehicles 142 and 152 determines whether the vehicle requires a tire change based on wear conditions received from one or more sensors, and transmits a tire change request to the server 120. The server 120 determines a number of vehicles that requested a tire change, determines whether the number of vehicles is greater than a first threshold number, and provides information about a tire change group discount to the vehicles that requested the tire change in response to determining that the number of vehicles is greater than the first threshold number. According to the present subject matter, vehicles automatically determine whether tires need to be changed and a system provides a group discount to vehicles that request tire changes. In this regard, vehicle owners may change tires in time with less cost.

FIG. 1 schematically depicts a system for collecting tire wear information from a plurality of vehicles in an area, according to one or more embodiments shown and described herein.

A system 100 includes a plurality of edge computing devices 110 and 112, a cloud server 120, a plurality of vehicles 142 and 152. The plurality of vehicles 142 and 152 may be located within a region 130. The edge computing device 110 is communicatively coupled to the cloud server 120 and the plurality of vehicles 142. The edge computing device 112 is communicatively coupled to the cloud server 120 and the plurality of vehicles 152. The cloud server 120 may be deployed in a cloud computing system, and may manage the plurality of edge computing devices 110 and 112.

The edge computing device 110 may receive tire wear information and/or tire change requests from the plurality of vehicles 142. The edge computing device 112 may receive tire wear information and/or tire change requests from the plurality of vehicles 152. The edge computing device 110 may communicate with other edge computing devices, e.g., the edge computing device 112 via a network. The edge computing device 110 may be a fixed edge server, e.g., a road-side unit. In some embodiment, the edge computing device 110 may be a moving edge server, e.g., one of the vehicles on the road.

By still referring to FIG. 1, the plurality of vehicles 142 and 152 are within the region 130. The region 130 may be a predetermined area and stored in the cloud server 120 or the edge computing devices 110 and 112. The number of vehicles 142 and 152 may be greater or smaller than the number of vehicles illustrated in FIG. 1. Each of the vehicles 142 and 152 may be a vehicle including an automobile or any other passenger or non-passenger vehicle such as, for example, a terrestrial, aquatic, and/or airborne vehicle. In some embodiments, the vehicle is an autonomous vehicle that navigates its environment with limited human input or without human input. In another embodiment, the vehicle may be an unmanned aerial vehicle (UAV), commonly known as a drone. Each of the vehicles 142 and 152 may obtain traffic data including positions, orientations, speeds, accelerations, fuel consumptions, emissions, lane information, input acceleration pedal forces, input braking forces, and the like, using various vehicle sensors and transmit the traffic data to the edge computing devices 110 and 112.

Each of the vehicles 142 and 152 may monitor wear conditions of the vehicle's tires using sensors. Each of the vehicles 142 and 152 may determine whether the vehicle requires a tire change based on the wear condition received from sensors, and transmit a tire change request to the edge computing device 110 or 112 via vehicle-to-everything (V2X) communication. In some embodiments, each of the vehicles 142 and 152 may transmit a tire change request directly to the server 120. The details of monitoring wear conditions of tires will be described in detail below with reference to FIG. 3.

Figure 2:
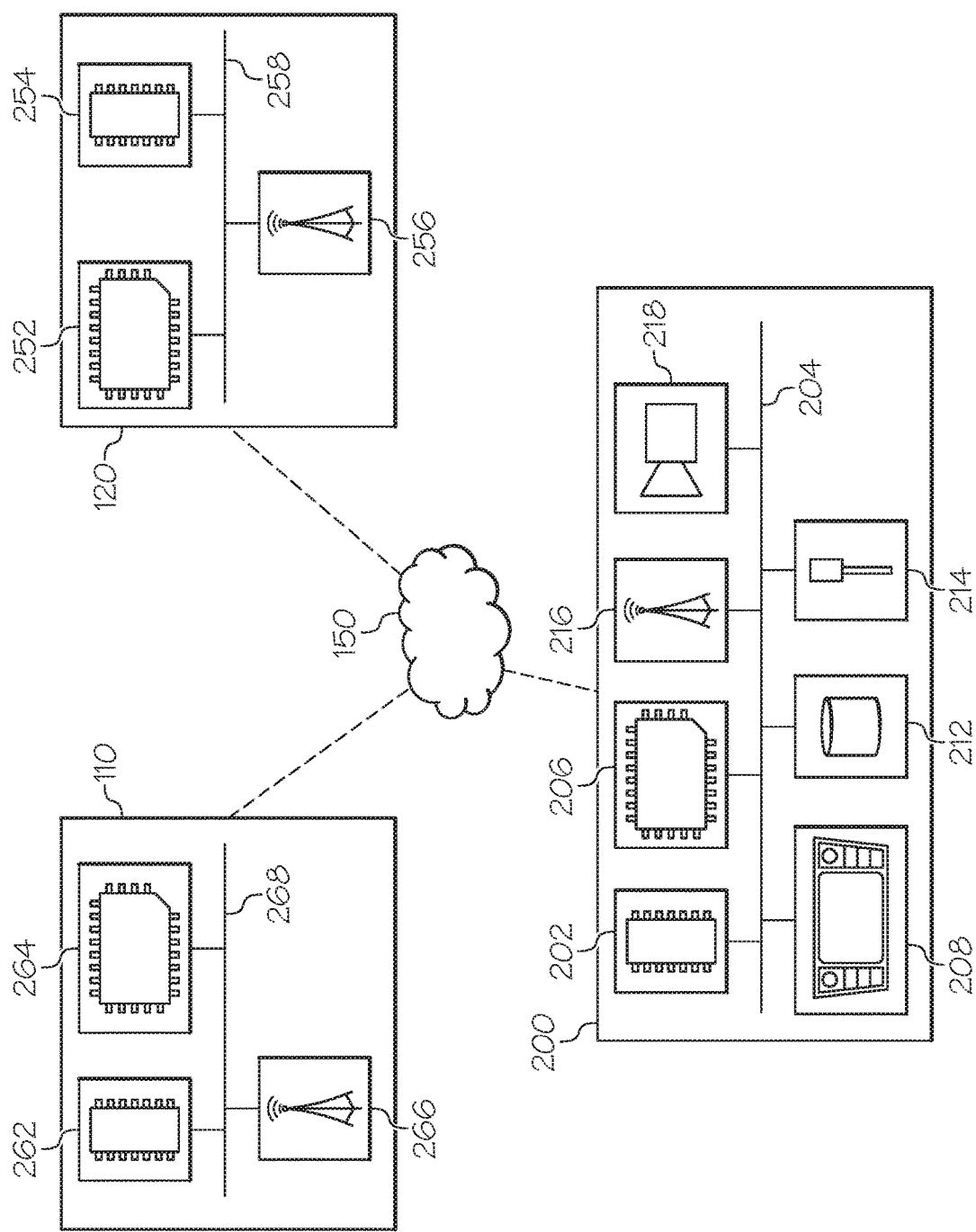
FIG. 2 depicts a schematic diagram of the system for providing tire change information to a group of vehicles, in accordance with one or more embodiments shown and described herein.

FIG. 2 depicts a schematic diagram of a system for providing tire change information to a group of vehicles including a vehicle system 200, the edge computing device 110 and the server 120, in accordance with one or more embodiments shown and described herein. It is noted that, while the vehicle system 200 is depicted in isolation, the vehicle system 200 may be included within a vehicle in some embodiments, for example, within each of the plurality of vehicles 142 and 152 of FIG. 1. In embodiments in which the vehicle system 200 is included within a vehicle, the vehicle may be an automobile or any other passenger or non-passenger vehicle such as, for example, a terrestrial, aquatic, and/or airborne vehicle. In some embodiments, the vehicle is an autonomous vehicle that navigates its environment with limited human input or without human input.

The vehicle system 200 includes one or more processors 202. Each of the one or more processors 202 may be any device capable of executing machine readable and executable instructions. Accordingly, each of the one or more processors 202 may be a controller, an integrated circuit, a microchip, a computer, or any other computing device. The one or more processors 202 are coupled to a communication path 204 that provides signal interconnectivity between various modules of the system. Accordingly, the communication path 204 may communicatively couple any number of processors 202 with one another, and allow the modules coupled to the communication path 204 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 204 may be formed from any medium that is capable of transmitting a signal such as, for example, conductive wires, conductive traces, optical waveguides, or the like. In some embodiments, the communication path 204 may facilitate the transmission of wireless signals, such as WiFi, Bluetooth®, Near Field Communication (NFC) and the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The vehicle system 200 includes one or more memory modules 206 coupled to the communication path 204. The one or more memory modules 206 may comprise RAM, ROM, flash memories, hard drives, or any device capable of storing machine readable and executable instructions such that the machine readable and executable instructions can be accessed by the one or more processors 202. The machine readable and executable instructions may comprise logic or algorithm(s) written in any programming language of any generation (e.g., 1 GL, 2 GL, 3 GL, 4 GL, or 5 GL) such as, for example, machine language that may be directly executed by the processor, or assembly language, object-oriented programming (OOP), scripting languages, microcode, etc., that may be compiled or assembled into machine readable and executable instructions and stored on the one or more memory modules 206. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. In some embodiments, the one or more memory modules 206 may include a plurality of data reduction metrics, and the one or more processors 202 may select an appropriate data reduction metric among the plurality of data reduction metrics based on information about the road on which a vehicle is currently traveling.

The one or more memory modules 206 may store vehicle identification data and/or tire identification data. The vehicle identification data may include vehicle identifying information such as, for example, the vehicle identification number ("VIN"), serial number, a make, model, class, or style of the vehicle, a year model, or other identifying information about the vehicle. Tire identification data may include a brand, style, type, age, or classification of the tire. In some embodiments, tire identification data may include a serial number, PKU, or other vendor-created identifying information. Tire identification data may be classified with respect to a group of tires or may be specific to an individual tire such as a front-right or rear-left tire, etc. In some embodiments, the tire identification data may be updated, for example, after routine maintenance (e.g., a tire rotation).

Referring still to FIG. 2, the vehicle system 200 comprises a screen 208 for providing visual output such as, for example, maps, navigation, entertainment, or a combination thereof. The screen 208 may output one of map, navigation, and entertainment. The screen 208 is coupled to the communication path 204. Accordingly, the communication path 204 communicatively couples the screen 208 to other modules of the vehicle system 200 including, without limitation, the one or more processors 202 and/or the one or more memory modules 206. In embodiments, the screen 208 may be a touchscreen that, in addition to visually displaying information, detects the presence and location of a tactile input upon a surface of or adjacent to the screen 208. For example, a driver or occupant of the vehicle may input a tire change request through the screen 208. Accordingly, each display may receive mechanical (e.g., touch) input directly upon the optical output provided by the screen 208.

The screen 208 may output wear conditions of tires of the vehicle based on data collected from one or more vehicle sensors 212. In some embodiments, the screen 208 may output an inquiry related to a tire change. For example, the screen 208 may display a question "You tires need to be changed. Do you want to send a tire change request?" In response to the inquiry, a driver of the vehicle may respond positively or negatively. If the driver responds positively, the vehicle system 200 may transmit a tire change request to the edge computing device 110 and/or the server 120.

The vehicle system 200 comprises a satellite antenna 214 coupled to the communication path 204 such that the communication path 204 communicatively couples the satellite antenna 214 to other modules of the vehicle system 200. The satellite antenna 214 is configured to receive signals from global positioning system satellites. Specifically, in one embodiment, the satellite antenna 214 includes one or more conductive elements that interact with electromagnetic signals transmitted by global positioning system satellites. The received signal is transformed into a data signal indicative of the location (e.g., latitude and longitude) of the satellite antenna 214 or an object positioned near the satellite antenna 214, by the one or more processors 202.

The vehicle system 200 comprises one or more vehicle sensors 212. Each of the one or more vehicle sensors 212 is coupled to the communication path 204 and communicatively coupled to the one or more processors 202. The one or more vehicle sensors 212 may include one or more motion sensors for detecting and measuring motion and changes in motion of the vehicle. The motion sensors may include inertial measurement units. Each of the one or more motion sensors may include one or more accelerometers and one or more gyroscopes. Each of the one or more motion sensors transforms sensed physical movement of the vehicle into a signal indicative of an orientation, a rotation, a velocity, or an acceleration of the vehicle.

Still referring to FIG. 2, the vehicle system 200 comprises network interface hardware 216 for communicatively coupling the vehicle system 200 to the edge computing device 110 and/or the cloud server 120. The network interface hardware 216 can be communicatively coupled to the communication path 204 and can be any device capable of transmitting and/or receiving data via a network. Accordingly, the network interface hardware 216 can include a communication transceiver for sending and/or receiving any wired or wireless communication. For example, the network interface hardware 216 may include an antenna, a modem, LAN port, Wi-Fi card, WiMax card, mobile communications hardware, near-field communication hardware, satellite communication hardware and/or any wired or wireless hardware for communicating with other networks and/or devices. The network interface hardware 216 of the vehicle system 200 may transmit its tire change request to the edge computing device 110 and/or the cloud server 120.

Still referring to FIG. 2, the vehicle system 200 comprises one or more image sensors 218 that are coupled to the communication path 204 and communicatively coupled to the one or more processors 202. In some embodiments, the image sensors 218 are cameras. While the depicted embodiment shows an icon with one image sensor 218 and reference is made herein to "image sensor" in the singular with respect to the vehicle system 200, it is to be understood that this is merely a representation and embodiments of the vehicle system 200 may include one or more image sensors 218 having one or more of the specific characteristics described herein.

In embodiments, when the one or more image sensors 218 include a camera, the camera may be any device having an array of sensing devices capable of detecting radiation in an ultraviolet wavelength band, a visible light wavelength band, or an infrared wavelength band. The camera may have any resolution. In some embodiments, one or more optical components, such as a mirror, fish-eye lens, or any other type of lens may be optically coupled to the camera. In embodiments described herein, the camera may provide image data to one or more processors 202 or another component communicatively coupled to the communication path 204. The image data may include image data of the tires 302 of the vehicle 300 in FIG. 3.

In embodiments where the one or more image sensors 218 include a camera, the camera may operate in the visual and/or infrared spectrum to sense visual and/or infrared light. Accordingly, the camera may detect thermal characteristics, changes, or gradients of the tires 312. Additionally, while the particular embodiments described herein are described with respect hardware for sensing light in the visual and/or infrared spectrum, it is to be understood that other types of sensors are contemplated. For example, the one or more image sensors 218 described herein could include one or more LIDAR sensors, radar sensors, sonar sensors, or other types of sensors.

In operation, the one or more image sensors 218 capture image data and communicate the image data to the one or more processors 202 and/or to other systems communicatively coupled to the communication path 204. The image data may be received by the one or more processors 202, which may process the image data using one or more image processing algorithms. Any known or yet-to-be developed video and image processing algorithms may be applied to the image data in order to identify an item or situation. Example video and image processing algorithms include, but are not limited to, kernel-based tracking (such as, for example, mean-shift tracking) and contour processing algorithms. In general, video and image processing algorithms may detect objects and movement from sequential or individual frames of image data. One or more object recognition algorithms may be applied to the image data to extract objects and determine their relative locations to each other. Any known or yet-to-be-developed object recognition algorithms may be used to extract the objects or even optical characters and images from the image data. Example object recognition algorithms include, but are not limited to, scale-invariant feature transform ("SIFT"), speeded up robust features ("SURF"), and edge-detection algorithms.

Still referring to FIG. 2, the vehicle system 200 may be communicatively coupled to the edge computing device 110 and the cloud server 120 by a network 150. In one embodiment, the network 150 may include one or more computer networks (e.g., a personal area network, a local area network, or a wide area network), cellular networks, satellite networks and/or a global positioning system and combinations thereof. Accordingly, the vehicle system 200 can be communicatively coupled to the network 150 via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth®, Wireless USB, Z-Wave, ZigBee, and/or other near field communication protocols. Suitable cellular networks include, but are not limited to, technologies such as LTE, WiMAX, UMTS, CDMA, and GSM.

The edge computing device 110 includes one or more processors 262, one or more memory modules 264, network interface hardware 266, and a communication path 268. The one or more processors 262 may be a controller, an integrated circuit, a microchip, a computer, or any other computing device. The one or more memory modules 264 may comprise RAM, ROM, flash memories, hard drives, or any device capable of storing machine readable and executable instructions such that the machine readable and executable instructions can be accessed by the one or more processors 262.

Still referring to FIG. 2, the cloud server 120 includes one or more processors 252, one or more memory modules 254, network interface hardware 256, and a communication path 258. The one or more processors 252 may be a controller, an integrated circuit, a microchip, a computer, or any other computing device. The one or more memory modules 254 may comprise RAM, ROM, flash memories, hard drives, or any device capable of storing machine readable and executable instructions such that the machine readable and executable instructions can be accessed by the one or more processors 252. The network interface hardware 256 communicates with the edge computing device 110 and the vehicle system 200.

Figure 3:
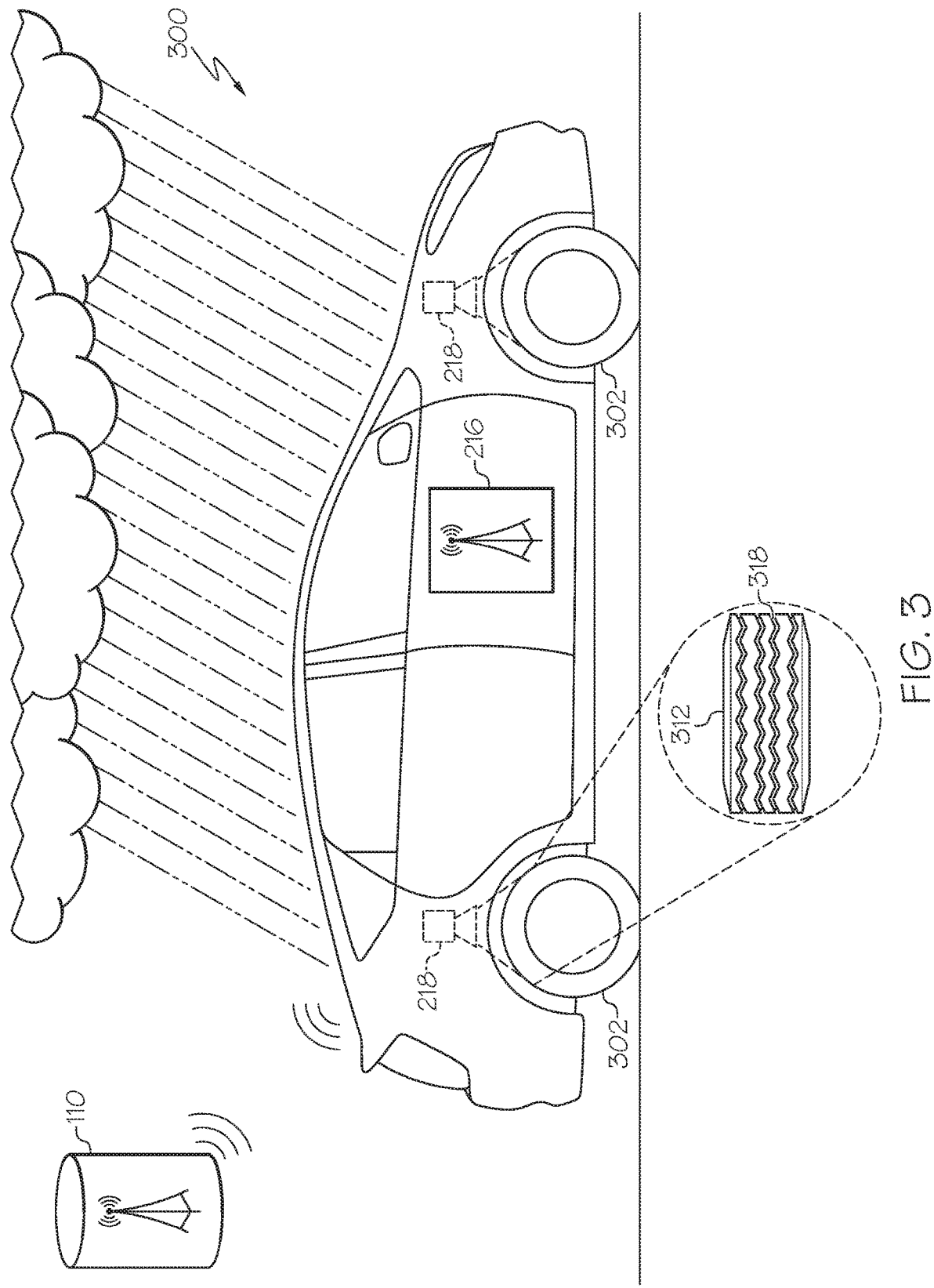
FIG. 3 depicts a vehicle monitoring tire wear conditions using image sensors, according to one or more embodiments shown and described herein.

Referring now to FIG. 3, a vehicle 300 including tires 302 and one or more image sensors 218 (e.g., cameras, LIDAR, etc.) is depicted. The vehicle 300 may include network interface hardware 216 and may be communicatively coupled with the edge computing device 110. The one or more image sensors 218 are aimed at the tires 302 such that the one or more image sensors 218 can capture one or more images and other image data associated with the tire 302. The one or more image sensors 218 may be spaced apart from the tire 302 such that an entire profile of the tire 302 is in a field of view of the one or more image sensors 218 but it is contemplated that only a portion of the profile of the tire 302 may be visible by the one or more image sensors 218.

While the particular embodiment depicted in FIG. 3 shows a vehicle 300 including one image sensor 218 per tire 302, it is to be understood that in some embodiments, more than one image sensor 218 may be configured to capture images of each tire 302. In other embodiments, not all of the tires 302 of the vehicle 300 have an image sensor 218 that is configured to image the tire 302. The particular embodiment shown in FIG. 3 shows the right side of the vehicle 300 and includes two image sensors 218. It is contemplated that the vehicle 300 may include one or more tires 302 on an opposite side of the vehicle 300 and that each of the tires 302 on the opposite side of the vehicle may include an image sensor 218. In some embodiments, the vehicle 300 may be an autonomous or semi-autonomous vehicle. Additionally, while the particular embodiment shown in FIG. 3 includes a vehicle 300 with image sensors 218 above the tires 302, this is merely one potential embodiment and it is to be understood that the image sensors 218 may be configured in any position with respect to the tires 302.

Generally speaking, as the vehicle 300 drives, the tires 302 will wear such that a tread 318 of the tires 302 wears. As the tread 318 wears, one or more image sensors 218 can be used to monitor the physical condition of the tires 302, such as, for example by discerning the presence of foreign objects and/or detecting anomalies in the structure of the tires 302 and/or measure the depth of the tread 318 by capturing image data which can be compared to reference images. Based on the comparison between real time data and the reference images, components of the vehicle 300 may provide an alert to the driver, recommend replacing one or more tires, and/or transmitting a tire change request to a server.

FIG. 4 depicts a flowchart for providing tire change information to a group of vehicles, according to one or more embodiments shown and described herein.

In step 410, the vehicle system 200 determines whether the vehicle 300 requires a tire change based on the wear condition received from one or more sensors. For example, by referring to FIG. 3, one or more image sensors 218 can be used to monitor the physical condition of the tires 302, such as, for example by discerning the presence of foreign objects and/or detecting anomalies in the structure of the tires 302 and/or measure the depth of the tread 318 by capturing image data which can be compared to reference images. Based on the comparison between real time data and the reference images, the vehicle system 200 may determine that the vehicle 300 may provide an alert to the driver, recommend replacing one or more tires, and/or transmitting a tire change request to the edge computing device 110 or the server 120.

In step 420, the vehicle system 200 transmits a tire change request to the edge computing device 110 or the server 120 in response to determination that the vehicle requires a tire change. In embodiments, the vehicle system 200 transmits a tire change request to the edge computing device 110 when it is determined that the vehicle requires a tire change based on the wear condition received from the one or more sensors. The vehicle system 200 may also transmit identification information about a vehicle including the vehicle system 200. The edge computing device 110 may transfer the tire change request along with identification information about a vehicle such as VIN number, license plate number, and the like to the server 120. The vehicle system 200 may also transmit tire identification data such as a brand, style, type, age, or classification of the tires.

In some embodiments, the vehicle system 200 may output an inquiry related to a tire change if it is determined that the vehicle requires a tire change. For example, the screen 208 may display a question "You tires need to be changed. Do you want to send a tire change request?" In response to the inquiry, a driver of the vehicle may respond positively or negatively. If the driver responds positively, the vehicle system 200 may transmit a tire change request to the edge computing device 110 and/or the server 120.

In step 430, the server 120 may receive tire change requests from a group of vehicles among the plurality of vehicles within the first region. For example, by referring to FIG. 1, the server 120 may receive tire change requests from a group of vehicles located within the region 130.

In step 440, the server 120 may determine the number of vehicles that requested tire change based on a number of the tire change requests received from the group of vehicles. For example, by referring to FIG. 1, the server 120 may determine that the server 120 receives eleven tire change requests from vehicles within the region 130.

In step 450, the server 120 may determine whether the number of vehicles is greater than a first threshold number. In embodiments, the first threshold number may be stored in the server 120. For example, the first threshold number is ten (10), and the number of vehicles that transmitted tire change requests is eleven (11). The first threshold number may be varied based on the size of the region 130, the price of a tire to be changed, and the like. For example, if the size of the region 130 is ten square miles, the first threshold number may be ten (10). If the size of the region 130 is twenty square miles, the first threshold number may be twenty (20). As another example, the first threshold number may be inversely correlated to the average price of tires to be changed. For example, if the average price of tires to be changed is 150 dollars based on information about the tires of the group of vehicles that transmitted tire change requests, the first threshold number may be set as 10. If the average price of tires to be changed is 120 dollars based on information about the tires of the group of vehicles that transmitted tire change requests, the first threshold number may be set as 15. If the average price of tires to be changed is 90 dollars based on information about the tires of the group of vehicles that transmitted tire change requests, the first threshold number may be set as 20.

If it is determined that the number of vehicles is greater than the first threshold number in step 450 (YES at step 450), the server 120 provides information about a tire change group discount and a location for changing tires to the vehicles that requested the tire change at step 460. For example, by referring to FIG. 1, the number of vehicles that submitted tire change requests is eleven (11) which is greater than the first threshold number (10). Then, the server 120 may provide information about a tire change group discount, e.g., 10 percent discount to each of the vehicles that submitted tire change requests, such that those vehicles can present a notification on their respective screens, or the like. The server 120 may also provide a location for changing tires to the vehicles that requested the tire change. A tire change shop may be located at the location and accept the provided tire change group discount.

In embodiments, the location of tire change may be determined based on locations of the vehicles that requested tire change. For example, by referring to FIG. 1, the locations of the vehicles 142 and 152 may be transmitted to the server 120, and the server 120 may select a tire store based on the locations of the vehicles 142 and 152. Specifically, the server 120 may select a tire store that requires least average traveling distance for the vehicles 142 and 152 to travel to the tire store.

If it is determined that the number of vehicles is not greater than the first threshold number in step 450 (NO at step 450), the server 120 may return to step 430 and continue to receive tire change requests from vehicles.

In some embodiments, if it is determined that the number of vehicles is not greater than the first threshold number in step 450 (NO at step 450), the server 120 may determine the number of vehicles in the second region that is greater than the initial region 130. Then, the server 120 may determine whether the number of vehicles in the second region that requested tire change is greater than the first threshold number. For example, the initial region 130 may be ten square miles and the second region may be twenty square miles. If it is determined that the number of vehicles in the second region that requested a tire change is greater than the first threshold number, the server 120 may provide information about the first tire change group discount to the vehicles in the second region that requested a tire change.

In some embodiments, if it is determined that the number of vehicles is not greater than the first threshold number in step 450 (NO at step 450), the server 120 may determine whether the number of vehicles is greater than a second threshold number. The second threshold number is smaller than the first threshold value. For example, the second threshold number is five and the first threshold number is ten. If it is determined that the number of vehicles that requested a tire change is greater than the second threshold number but less than the first threshold number, the server 120 may provide information about a second tire change group discount to the vehicles that request a tire change. The second tire change group discount is different from the first tire change group discount. For example, the first tire change group discount may be ten percent discount, and the second tire change group discount may be five percent discount.

It should now be understood that a system for providing tire change information is provided. The system determines a number of vehicles that requested a tire change, determines whether the number of vehicles is greater than a first threshold number, and provides information about a first tire change group discount to the vehicles that requested the tire change in response to determining that the number of vehicles is greater than the first threshold number. According to the present subject matter, vehicles automatically determine whether tires need to be changed and a system receives information about vehicles whose tires need to be changed within a certain region. If the number of vehicles that require a tire change is greater than a threshold value, then the system may provide a group discount for tire changes to the group of vehicles. In this regard, vehicle owners may change tires in time with less cost.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system comprising:
   a processor; and
   a memory module storing one or more processor-readable instructions that when executed by the processor cause the processor to:
      receive a plurality of tire change requests, each tire change request of the plurality of tire change requests being transmitted upon determining a tire change is required based on an image of a tire of each vehicle of a plurality of vehicles obtained from an image sensor of the each vehicle;
      determine respective locations of the plurality of vehicles;
      determine a number of first vehicles among the plurality of vehicles that are located in a first region and transmitted a tire change request from the first region;

determine whether the number of the first vehicles is greater than a first threshold number;

provide information about a first tire change group discount to the first vehicles in response to determining that the number of vehicles is greater than the first threshold number;

determine a tire change location that has a least average traveling distance from the locations of the first vehicles to travel to the tire change location;

transmit the tire change location to the first vehicles; and instruct the first vehicles to display the information on a screen.

2. The system of claim 1, wherein the one or more processor-readable instructions, when executed by the processor, cause the processor to:

determine whether the number of the first vehicles is greater than a second threshold number in response to determination that the number of first vehicles is not greater than the first threshold number; and provide information about a second tire change group discount to the first vehicles that transmitted tire change requests in response to determining that the number of the first vehicles is greater than the second threshold number.

3. The system of claim 1, further comprising the plurality of vehicles, wherein the each vehicle of the plurality of vehicles comprises:

a controller configured to:
  determine whether the each vehicle requires a tire change based on a comparison between the image data obtained in real time and a reference image.

4. The system of claim 1, further comprising the plurality of vehicles, wherein the each vehicle of the plurality of vehicles comprises:

a controller configured to:
  determine whether the each vehicle requires a tire change based on the image data obtained in real time;
  output an inquiry related to a tire change in response to determination that the each vehicle requires a tire change; and
  transmit a tire change request to the processor in response to receiving a response to the inquiry.

5. The system of claim 1, wherein the one or more processor-readable instructions, when executed by the processor, cause the processor to:

in response to determination that the number of the first vehicles is not greater than the first threshold number, determine a number of vehicles located in a second region in which the tire change request was transmitted, the second region being greater than the first region;

determine whether the number of vehicles among the plurality of vehicles located in the second region that transmitted tire change requests is greater than the first threshold number; and provide information about the first tire change group discount to the vehicles located in the second region that transmitted tire change requests in response to determining that the number of vehicles located in the second region that transmitted tire change requests is greater than the first threshold number.

6. The system of claim 1, the system further comprising the plurality of vehicles, wherein the each vehicle of the plurality of vehicles comprises:
the screen configured to display the information.

7. A method for providing tire change information, the method comprising:

receiving a plurality of tire change requests, each tire change request of the plurality of tire change requests being transmitted upon determining a tire change is required based on an image of a tire of each vehicle of a plurality of vehicles obtained from an image sensor of the each vehicle;

determining respective locations of the plurality of vehicles;

determining a number of first vehicles among the plurality of vehicles that are located in a first region and transmitted a tire change request from the first region;

determining whether the number of the first vehicles is greater than a first threshold number;

providing information about a first tire change group discount to the first vehicles in response to determining that the number of the first vehicles is greater than the first threshold number;

determining a tire change location that has a least average traveling distance from the locations of the first vehicles to travel to the tire change location;

transmitting the tire change location to the first vehicles; and instructing the first vehicles that transmitted tire change requests to display the information on a screen.

8. The method of claim 7, further comprising:

determining whether the number of the first vehicles is greater than a second threshold number in response to determination that the number of the first vehicles is not greater than the first threshold number; and providing information about a second tire change group discount to the first vehicles that transmitted tire change requests in response to determining that the number of vehicles is greater than the second threshold number.

9. The method of claim 7, further comprising:

in response to determination that the number of the first vehicles is not greater than the first threshold number, determining a number of vehicles among the plurality of vehicles located in a second region in which that the tire change request was transmitted, the second region being greater than the first region;

determining whether the number of vehicles located in the second region that transmitted tire change requests is greater than the first threshold number; and providing information about the first tire change group discount to the vehicles located in the second region that transmitted tire change requests in response to determining that the number of vehicles located in the second region that transmitted tire change requests is greater than the first threshold number.

10. The method of claim 7, further comprising:

determining a tire change location that has a least average traveling distance from the locations of the vehicles located in the second region that transmitted tire change requests to travel to the tire change location;

transmitting the tire change location to the vehicles located in the second region that that transmitted tire change requests.

* * * * *